United States Patent
Kamei et al.

(10) Patent No.: US 10,757,603 B2
(45) Date of Patent: Aug. 25, 2020

(54) GATEWAY FUNCTION COLLECTING DATA FROM NEARBY DEVICES AT FIRST AND SECOND POSITIONS AND TIMINGS FOR TRANSMISSION TO A BASE STATION

(71) Applicant: NEC Corporation, Tokyo (JP)

(72) Inventors: Akira Kamei, Tokyo (JP); Toru Yamada, Tokyo (JP); Masahiro Serizawa, Tokyo (JP); Kyoji Hirata, Tokyo (JP); Yumiko Okuyama, Tokyo (JP); Satoshi Hasegawa, Tokyo (JP); Masashi Shimoma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/335,838

(22) PCT Filed: Sep. 21, 2017

(86) PCT No.: PCT/JP2017/034176
§ 371 (c)(1),
(2) Date: Mar. 22, 2019

(87) PCT Pub. No.: WO2018/056385
PCT Pub. Date: Mar. 29, 2018

(65) Prior Publication Data
US 2020/0022015 A1 Jan. 16, 2020

(30) Foreign Application Priority Data
Sep. 23, 2016 (JP) .................................. 2016-186223

(51) Int. Cl.
*H04W 4/02* (2018.01)
*H04Q 9/00* (2006.01)
(Continued)

(52) U.S. Cl.
CPC .......... *H04W 28/0247* (2013.01); *H04Q 9/00* (2013.01); *H04Q 2209/10* (2013.01); *H04Q 2209/40* (2013.01); *H04W 88/16* (2013.01)

(58) Field of Classification Search
CPC ......... H04W 4/70; H04W 4/38; H04W 84/18; H04W 88/16; H04W 4/44; H04W 40/02;
(Continued)

(56) References Cited

U.S. PATENT DOCUMENTS

2012/0281658 A1* 11/2012 Rikkinen .............. H04W 88/04
370/329
2014/0376526 A1   12/2014 Nishikata et al.
2016/0135242 A1*  5/2016 Hampel ................ H04W 40/02
370/329

FOREIGN PATENT DOCUMENTS

JP   2004-362267 A   12/2004
JP   2006-003946 A    1/2006
WO   WO-2013/133213 A1   9/2013

OTHER PUBLICATIONS

International Search Report corresponding to PCT/JP2017/034176, dated Nov. 28, 2017, 3 pages.
(Continued)

*Primary Examiner* — Philip Sobutka
(74) *Attorney, Agent, or Firm* — Wilmer Cutler Pickering Hale and Dorr LLP (57) ABSTRACT

To avoid congestion and an overload at the time of data transmission from an IoT device to a wireless network, at least one gateway apparatus is controlled to execute a gateway function at a first timing at a first position, collect data from a plurality of devices present near the first position, and transmit aggregated data to a base station, and to execute the gateway function at a second timing different from the first timing at a second position different from the first position, collect data from a plurality of devices present
(Continued)

near the second position, and transmit aggregated data to the base station.

10 Claims, 8 Drawing Sheets

(51) Int. Cl.
*H04W 28/02* (2009.01)
*H04W 88/16* (2009.01)

(58) Field of Classification Search
CPC . H04W 76/14; H04W 8/005; H04W 28/0247; H04Q 2209/60; H04Q 9/00; H04Q 2209/10; H04Q 2209/40; H04L 67/12; G08C 15/00; G08C 17/00
USPC ...... 455/422.1, 423, 424, 425, 456.1, 456.3, 455/456.5, 67.11
See application file for complete search history.

(56) References Cited

OTHER PUBLICATIONS

3 GPP TR 22.891 V14.1.0 (Jun. 2016), 3rd Generation Partnership Project; Technical Specification Group Services and System Aspects; Feasibility Study on New Services and Markets Technology Enablers; Stage 1, (Release 14); 95 pages.

\* cited by examiner

GATEWAY FUNCTION COLLECTING DATA FROM NEARBY DEVICES AT FIRST AND SECOND POSITIONS AND TIMINGS FOR TRANSMISSION TO A BASE STATION

CROSS REFERENCE TO RELATED APPLICATIONS

This application is a national stage application of International Application No. PCT/JP2017/034176 entitled "INFORMATION PROCESSING APPARATUS, GATEWAY APPARATUS, INFORMATION PROCESSING METHOD, AND INFORMATION PROCESSING PROGRAM," filed on Sep. 21, 2017, which claims the benefit of priority from Japanese patent application No. 2016-186223, filed on Sep. 23, 2016, the disclosure of which is incorporated herein in its entirety by reference.

TECHNICAL FIELD

The present invention relates to an information processing apparatus, a gateway apparatus, an information processing method, and an information processing program.

BACKGROUND ART

Non-patent literature 1 discloses a form in which many IoT (Internet of Things) devices exchange data with an MTC (Machine Type Communication) server via a wireless network.

CITATION LIST

Non-Patent Literature

Non-patent literature 1: 3GPP TR 22.891 V14.1.0 (2016-06)

SUMMARY OF THE INVENTION

Technical Problem

In the technique described in the above literature, however, when many IoT devices simultaneously access a wireless network, congestion and an overload in the wireless network cannot be avoided.

The present invention enables to provide a technique of solving the above-described problem.

Solution to Problem

One example aspect of the present invention provides an information processing apparatus that controls at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

Another example aspect of the present invention provides a gateway apparatus comprising:

a transmitter that executes a gateway function at a first timing at a first position, collects data from a plurality of devices present near the first position, and transmits aggregated data to a base station, and executes the gateway function at a second timing different from the first timing at a second position different from the first position, collects data from a plurality of devices present near the second position, and transmits aggregated data to the base station; and a moving unit that moves from the first position to the second position.

Still other example aspect of the present invention provides an information processing method for controlling at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

Still other example aspect of the present invention provides an information processing program for causing a computer to execute a method, comprising controlling at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

Advantageous Effects of Invention

According to the present invention, when many IoT devices access a wireless network, congestion and an overload in the wireless network can be avoided.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIGS. 1A and 1B. The information processing apparatus 100 is an apparatus that controls a gateway function at a plurality of locations and collects data from a plurality of devices.

Figure 1A:
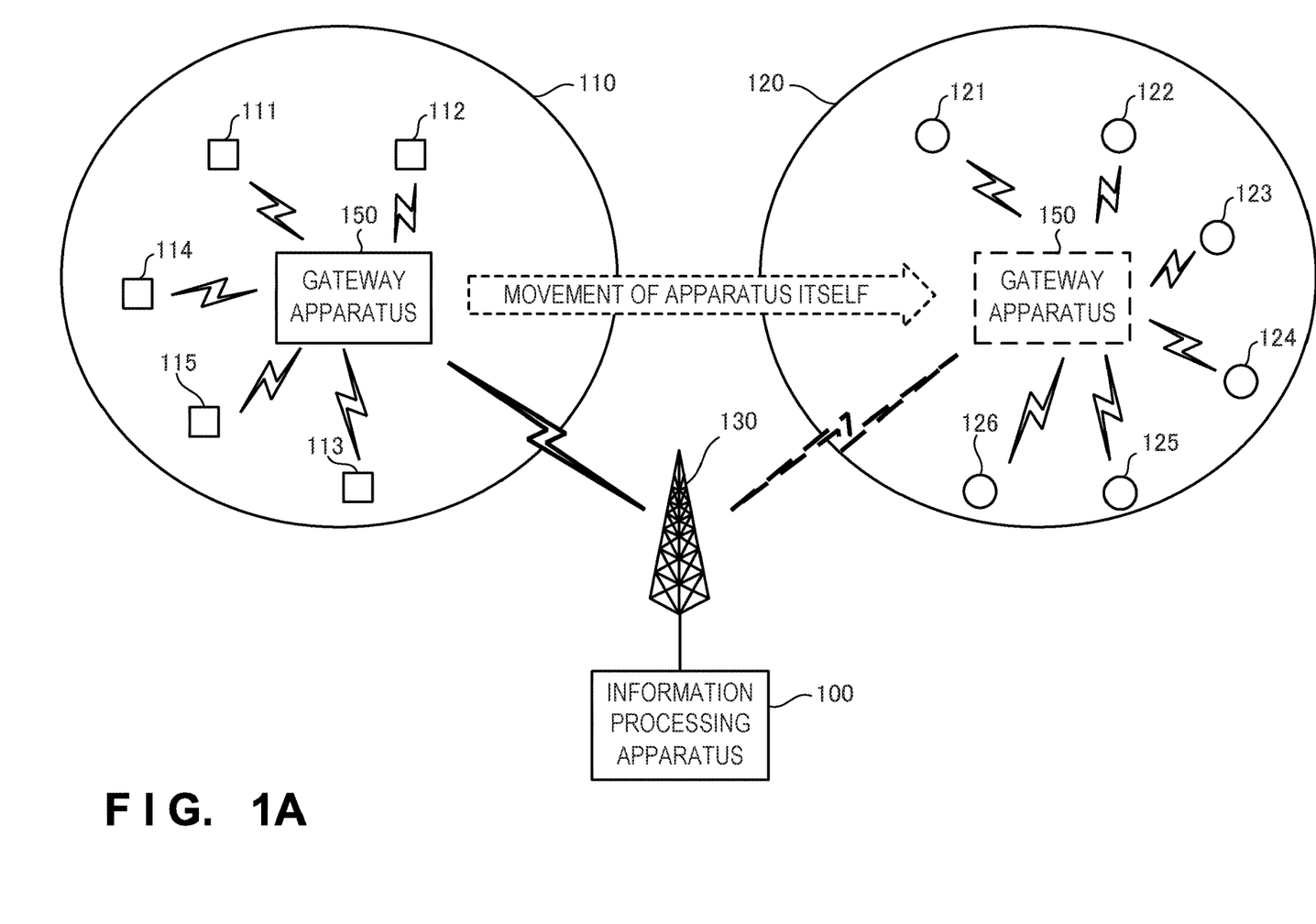
FIG. 1A is a block diagram showing the arrangement of a communication processing system according to the first example embodiment of the present invention.

A gateway apparatus 150 shown in FIG. 1A executes the gateway function at the first timing at a first position 110, collects data from a plurality of devices 111 to 115 present near the first position 110, generates aggregated data, and transmits the aggregated data to a base station 130.

The gateway apparatus 150 moves to a second position 120 different from the first position 110, executes the gateway function at the second timing different from the first timing, collects data from a plurality of devices 121 to 127 present near the second position 120, generates aggregated data, and transmits the aggregated data to the base station 130.

The information processing apparatus 100 implements the above-described function by controlling the gateway apparatus 150.

Figure 1B:
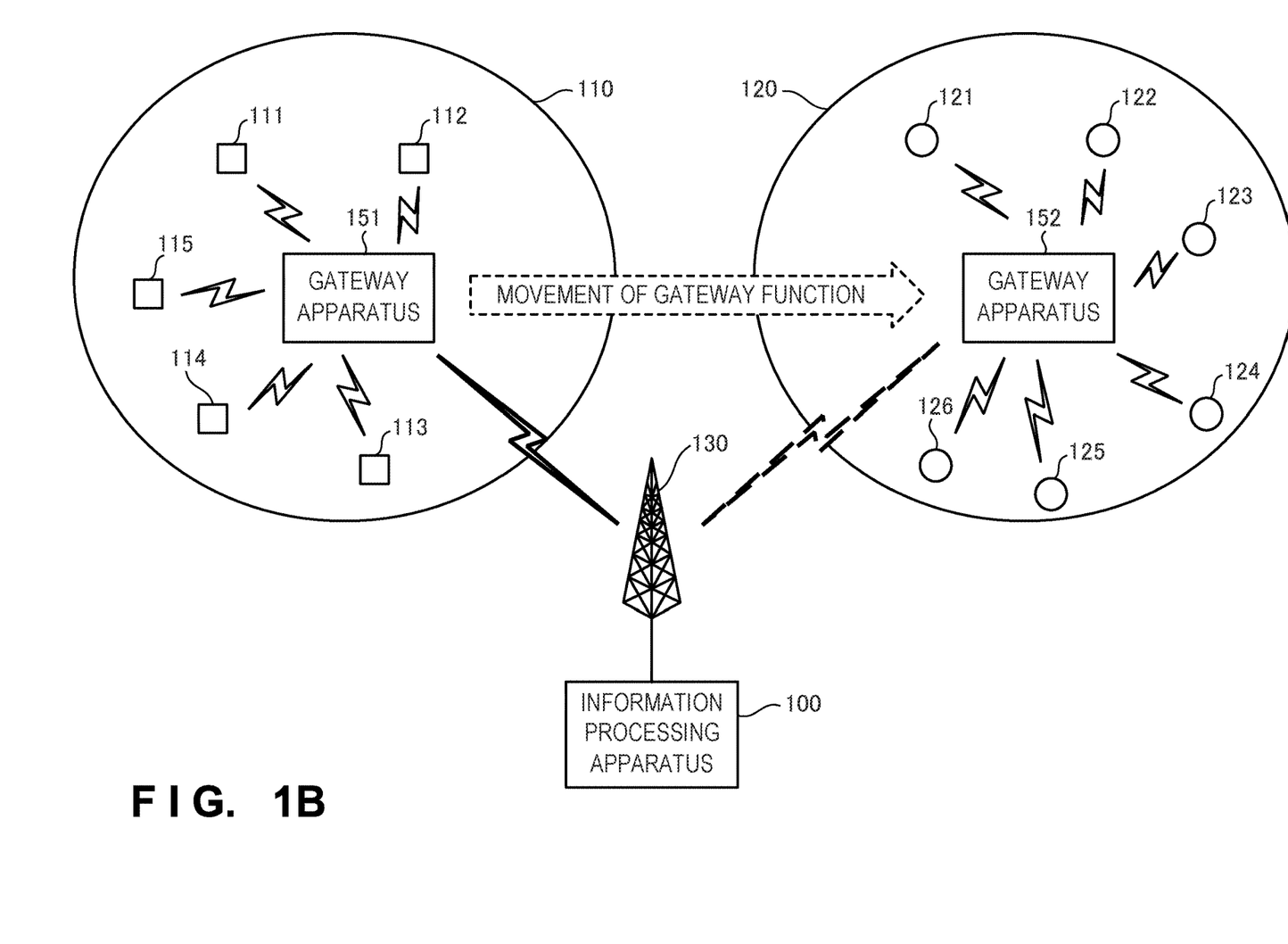
FIG. 1B is a block diagram showing the arrangement of the communication processing system according to the first example embodiment of the present invention.

A gateway apparatus 151 shown in FIG. 1B executes the gateway function at the first timing at the first position 110, collects data from the devices 111 to 115 present near the first position 110, generates aggregated data, and transmits the aggregated data to a base station 130.

A gateway apparatus 152 that inherits the gateway function from the gateway apparatus 151 executes the gateway function at the second timing different from the first timing at the second position 120 different from the first position 110, collects data from the devices 121 to 127 present near the second position, generates aggregated data, and transmits the aggregated data to the base station 130.

The information processing apparatus 100 implements the above-described function by controlling the gateway apparatuses 151 and 152.

According to the example embodiment shown in FIGS. 1A and 1B, the transmission times of data from devices to the base station can be controlled not to overlap each other, so the same wireless resource can be used, and the wireless resource can be used efficiently. Processing in the base station is reduced by aggregating data from a plurality of devices by the gateway apparatus, and congestion and an overload in the wireless network can be relieved.

Second Example Embodiment

An information processing apparatus 200 according to the second example embodiment of the present invention will be described with reference to FIG. 2 and subsequent drawings.

The information processing apparatus 200 includes an MTC server 201, a core network 202, a base station 203, a gateway apparatus 204, and IoT devices (to be simply referred to as devices hereinafter) 211 to 219. Although only nine IoT devices are illustrated in FIG. 2 for convenience, they can be considered to represent some of several hundred, several thousand, or several ten thousand IoT devices in a cell 210.

Figure 2:
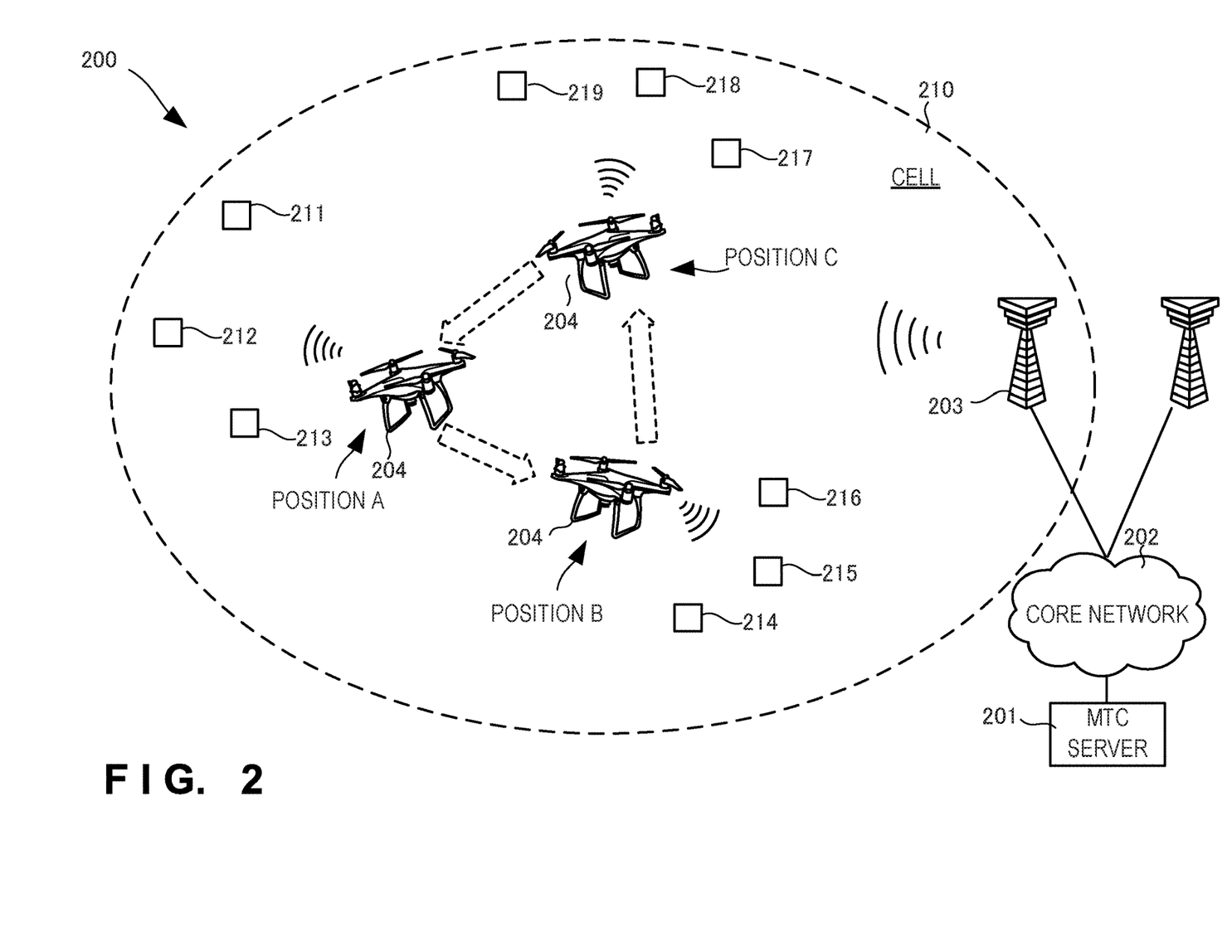
FIG. 2 is a view showing the arrangement of a communication processing system according to the second example embodiment of the present invention.

As shown in FIG. 2, the gateway apparatus 204 is, for example, a remote control mobile unit such as a drone and can move to various positions in the cell 210. The MTC server 201 controls the gateway apparatus 204 via the core network 202 and the base station 203 and collects data from the devices 211 to 219. For example, the MTC server 201 moves the gateway apparatus 204 to a position A, and controls it to sequentially collect data from the nearby devices 211 to 213 and transmit them as aggregated data to the base station 203. Then, the MTC server 201 moves the gateway apparatus 204 to a position B, and controls it to sequentially collect data from the nearby devices 214 to 216 and transmit them as aggregated data to the base station 203. Similarly, the MTC server 201 moves the gateway apparatus 204 to a position C, and controls it to collect data from the nearby devices 217 to 219 and transmit them as aggregated data to the base station 203. In this manner, the gateway apparatus is moved to sequentially collect data. Even when simultaneous accesses from many IoT devices to a wireless network are assumed, congestion and an overload in the gateway apparatus and the wireless network can be avoided. Note that the time to move the drone is necessary, but a delay of data transmission arising from this does not matter. This is because the cycle of data collection from an IoT device is relatively long such as 30 min or 1 h in general and is not temporally critical.

Figure 3:
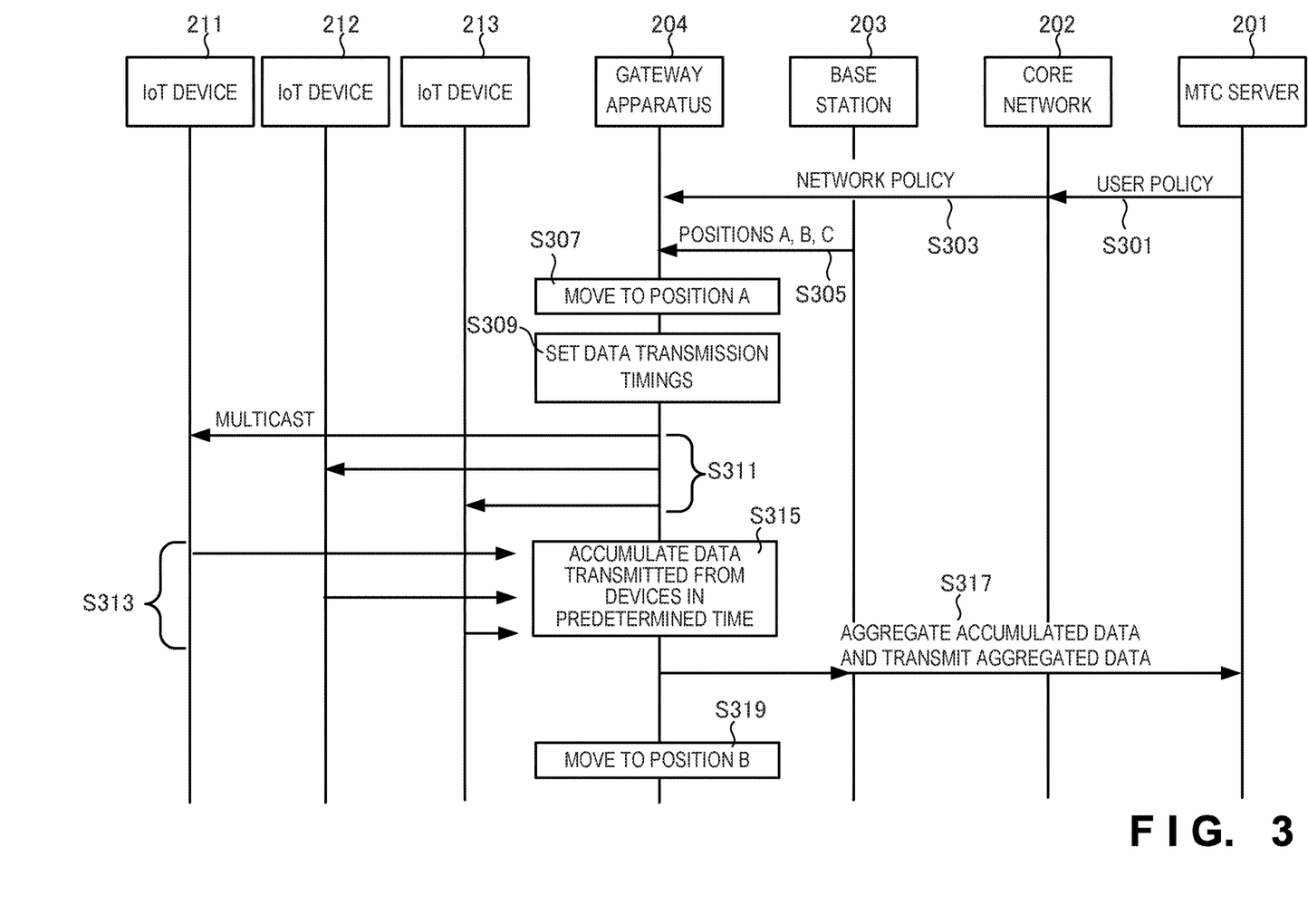
FIG. 3 is a sequence chart showing a sequence of processing in the communication processing system according to the second example embodiment of the present invention.

FIG. 3 is a sequence chart showing exchange of data between the respective functional components shown in FIG. 2.

Figure 4:
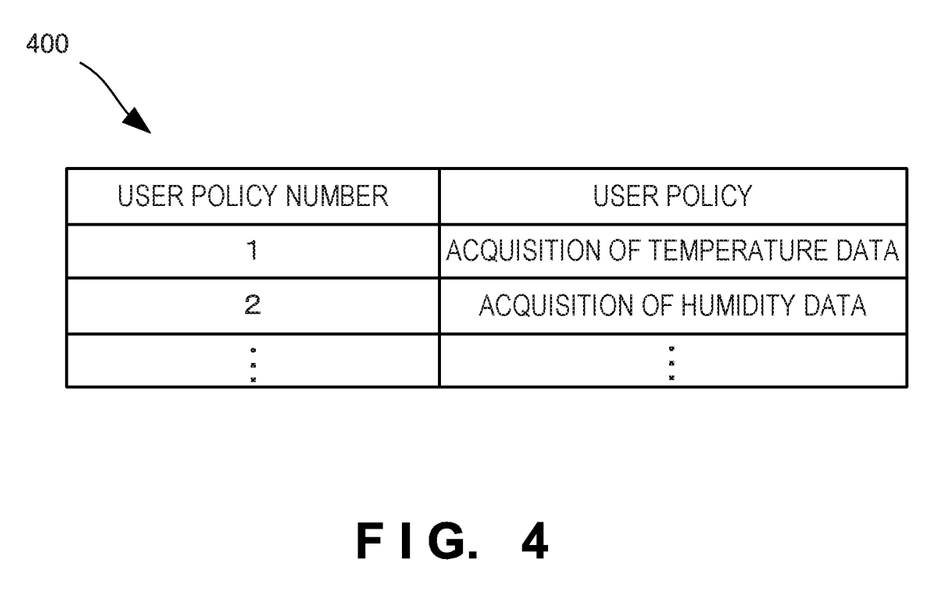
FIG. 4 is a table showing a user policy table in the communication processing system according to the second example embodiment of the present invention.

The MTC server 201 holds a user policy table 400 shown in FIG. 4. For example, when the MTC server 201 receives a request from a user to acquire temperature data in the specific cell 210, the MTC server 201 determines "1" as a user policy number complying with the user policy and transmits it to the core network 202 (S301).

Figure 5:
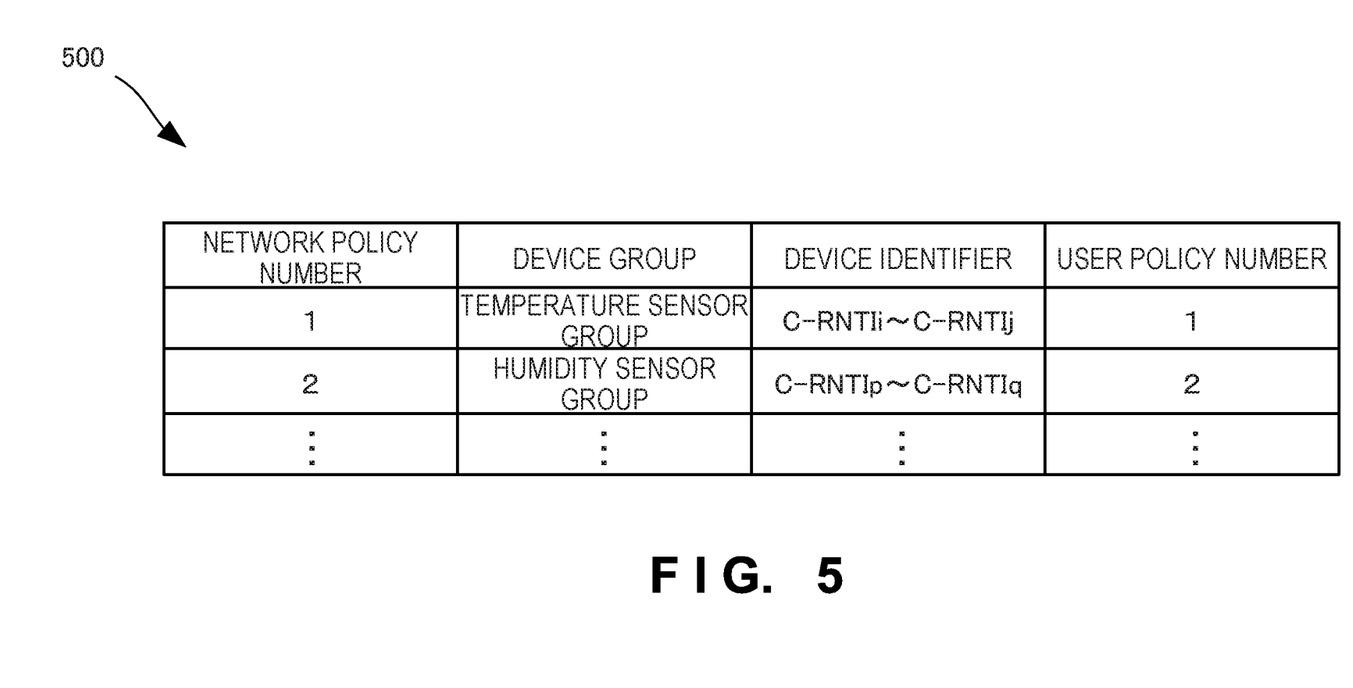
FIG. 5 is a table showing a network policy table in the communication processing system according to the second example embodiment of the present invention.

The core network 202 holds a network policy table 500 shown in FIG. 5 and derives a network policy number from the user policy number. Then, the core network 202 acquires an IoT device identifier (C-RNTI: Cell-Radio Network Temporary ID) that is associated with the network policy number and exists in the specific cell. The core network 202 transmits the IoT device identifier to the gateway apparatus 204 (S303).

The base station 203 notifies the gateway apparatus 204 of the device positions A, B, and C having the IoT device identifier designated by the core network 202 (S305).

The gateway apparatus 204 moves to the notified position A (S307) and sets, for the devices 211 to 213 around the position A, data transmission timings that are at random in a predetermined range and do not overlap each other (S309). Further, the gateway apparatus 204 notifies the respective devices 211 to 213 of the data transmission timings using multicast (S311). Here, the gateway apparatus 204 itself determines the data transmission timings of the respective devices. However, the present invention is not limited to this, and the base station 203 may notify the gateway apparatus 204 of the data transmission timings of the respective devices.

The devices 211 to 213 transmit data at separate timings in synchronization with the data transmission timings received from the gateway apparatus 204 (S313).

The gateway apparatus 204 accumulates the data transmitted from the devices (S315), waits till the timing (time) to transmit data from the final device, then aggregates the accumulated data, and transmits the aggregated data to the MTC server 201 (S317). After the gateway apparatus 204 aggregates the accumulated data at the position A and transmits the aggregated data to the MTC server 201, it moves to the position B in step S319.

Subsequently, the gateway apparatus 204 repeats notification of data transmission timings, and aggregation and transmission of data while moving to respective positions. The gateway apparatus can collect data at different timings from respective devices while moving. In the cell, data can be collected from all devices capable of providing data desired by the user, without the concern about congestion and an overload in the wireless network.

Figure 6:
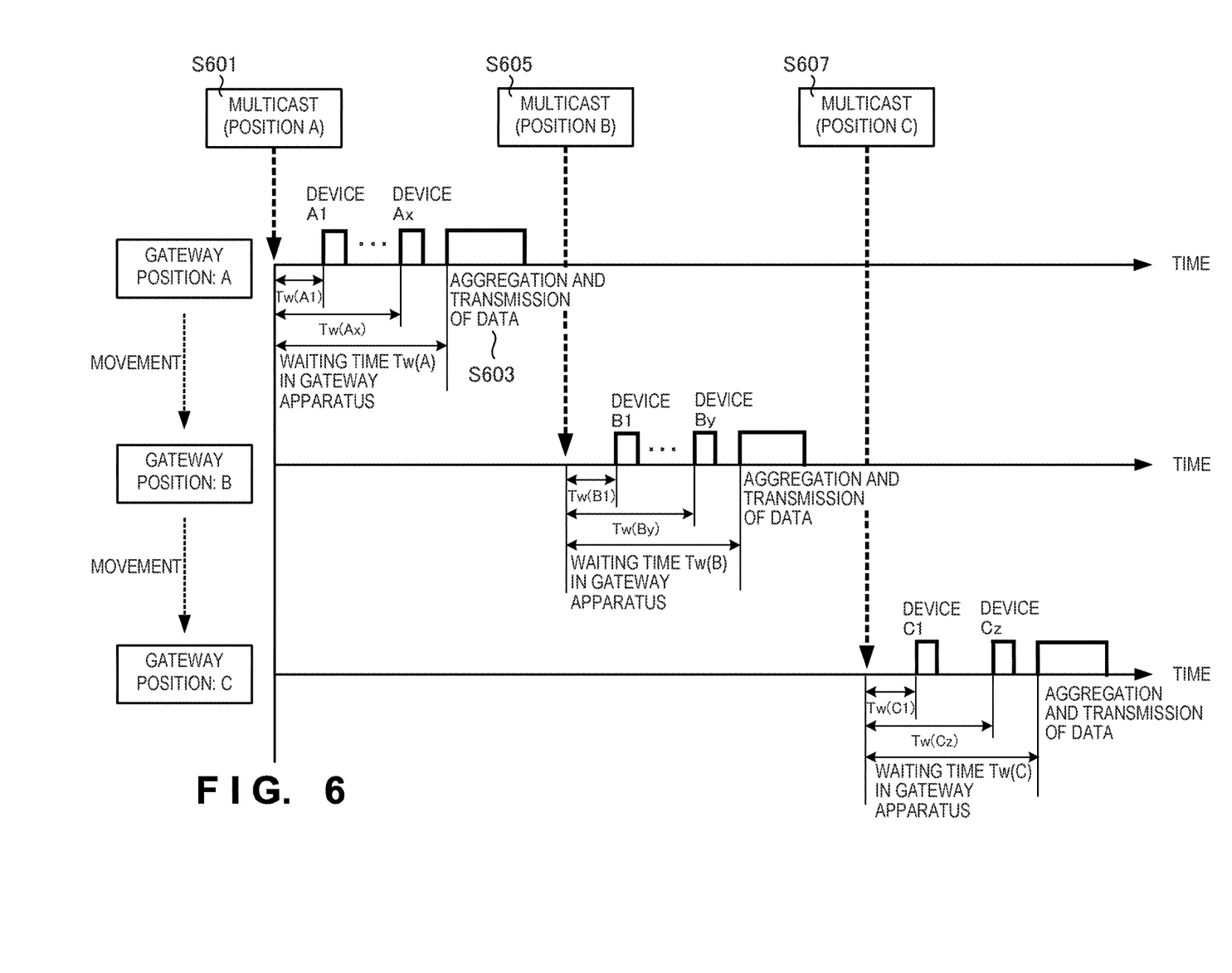
FIG. 6 is a timing chart showing the transmission timing of data in the communication processing system according to the second example embodiment of the present invention.

FIG. 6 is a timing chart showing a sequence of collecting data by the gateway apparatus 204 from devices at respective positions.

The gateway apparatus 204 notifies all devices A1 to Ax (corresponding to the devices 211 to 213 in FIG. 2) present near the position A of different data transmission timings complying with a policy from the core network 202 by multicast (S601).

For example, the device A1 that is a temperature sensor transmits temperature information after waiting for Tw(A1) represented by random timing information received from the gateway apparatus 204. Similarly, the device Ax transmits temperature information after waiting for Tw(Ax) represented by random timing information received from the gateway apparatus 204. That is, each device performs data transmission after waiting for a time separately designated by the gateway apparatus 204.

The gateway apparatus 204 accumulates data transmitted from the devices A1 to Ax till a preset maximum waiting time Tw(A) at the position A. At the maximum waiting time Tw(A), the gateway apparatus 204 aggregates temperature data collected from the devices A1 to Ax and transmits the aggregated data to the MTC server 201 (S603). It suffices to determine the maximum waiting time Tw(A) in accordance with the number of devices around the position A, and the maximum waiting time Tw(A) may take a value that differs between respective positions.

At this time, the gateway apparatus 204 collects only data transmitted from the devices at a received signal strength (RSSI: Received Signal Strength Indicator) higher than a predetermined threshold. Hence, only signals from devices near the gateway apparatus 204 present at the position A are collected.

Since the gateway apparatus 204 moves to the vicinity of each device, the transmission power of the device can be suppressed. After the end of aggregation and transmission of data at the position A, the gateway apparatus 204 moves to the position B and notifies devices of timings using multicast again, as in the position A (S605). At this time, the identifiers of the devices having undergone collection at the position A are excluded. Similarly, after the end of transmission of aggregated/transmitted data at the position B, the gateway apparatus 204 moves to the position C and performs the same operation (S607).

More specifically, the gateway apparatus 204 instructs, about data transmission timings by multicast at each position, all devices from which data have not been collected. As the number of devices from which data have been collected increases, the number of devices to be notified of timings is gradually decreased.

By the above-described processing, the gateway apparatus 204 aggregates data transmitted from the devices 211 to 219 in a preset data reception period and transmits the aggregated data to the MTC server 201 via the base station 203 and the core network 202.

A wireless resource for transmission from a device to the gateway apparatus 204 is temporally divided and shared. Congestion of the network can therefore be avoided while suppressing consumption of the wireless resource in the cell 210.

Various moving patterns of the gateway apparatus 204 are conceivable. For example, the gateway apparatus 204 may circulate in a predetermined direction in the cell 210, circulate at random in the cell 210, or preferentially move to a specific point in accordance with an instruction from the base station 203. The gateway apparatus 204 may be circulated based on the priority order to respective positions in the cell that are set by the base station 203. The gateway apparatus 204 may be circulated on, for example, the hour when generation of data is predicted. The moving timing and moving destination of the gateway apparatus 204 may be instructed by the base station 203 or by the MTC server 201 via the core network 202. Further, the gateway apparatus 204 may acquire a device arrangement in the cell, determine timings and locations by itself, and move.

Instead of multicasting transmission timings at each position, it is also possible to multicast transmission timings to all devices at the starting point and move the gateway apparatus 204 to respective points so as to arrive before the transmission timings. In this case, a time lag considering the time of movement between points is preferably provided for the transmission timings. That is, if the gateway apparatus 204 circulates to the positions A, B, and C, the timeout time is prolonged in this order.

Figure 7:
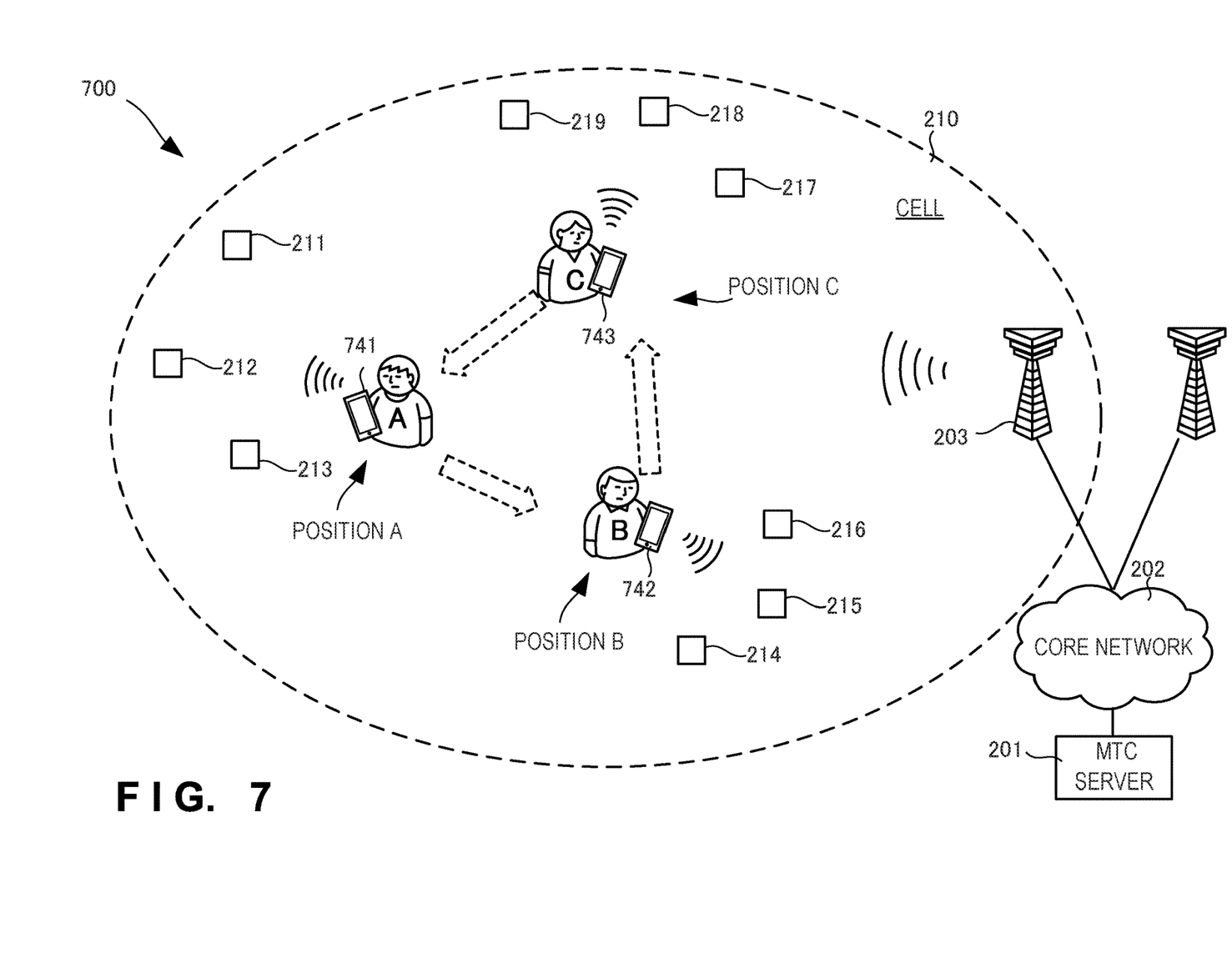
FIG. 7 is a view showing another arrangement of the communication processing system according to the second example embodiment of the present invention.

The gateway apparatus may be a dedicated device or the gateway function may be installed in a smartphone or the like. That is, the gateway apparatus may be pseudo-moved by switching the gateway function between smartphones 741 to 743 of separate users, as shown in FIG. 7.

As described above, according to this example embodiment, the times of transmission from IoT devices are controlled not to overlap each other, so the same wireless resource can be used, and the wireless resource can be used efficiently. Processing at the base station is reduced by aggregating data transmitted from a plurality of IoT devices by the gateway apparatus, and relief of congestion and an overload in the wireless network can be expected. The data transmission distance of the IoT device can be shortened by moving the gateway apparatus or its function in the cell. A long-period operation of the IoT device becomes possible by suppressing the transmission power of the device.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an information processing apparatus that controls at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

(Supplementary Note 2)

There is provided the information processing apparatus according to supplementary note 1, wherein the information processing apparatus controls one gateway apparatus that moves from the first position to the second position, to execute the gateway function at the first timing at the first position, collect data from a device present near the first position, and transmit aggregated data to the base station, and execute the gateway function at the second timing different from the first timing at the second position different from the first position, collect data from a device present near the second position, and transmit aggregated data to the base station.

(Supplementary Note 3)

There is provided the information processing apparatus according to supplementary note 1, wherein the information processing apparatus controls a first gateway apparatus that collects data from a device present near the first position at the first timing at the first position and transmits aggregated data to the base station, and a second gateway apparatus that collects data from a device present near the second position at the second timing different from the first timing at the second position different from the first position and transmits aggregated data to the base station.

(Supplementary Note 4)

There is provided the information processing apparatus according to supplementary note 3, wherein the gateway apparatus is circulated in a predetermined direction to respective positions in a cell that are set by the base station.

(Supplementary Note 5)

There is provided the information processing apparatus according to supplementary note 3, wherein the gateway apparatus is circulated at random to respective positions in a cell that are set by the base station.

(Supplementary Note 6)

There is provided the information processing apparatus according to supplementary note 3, wherein the gateway apparatus is circulated based on a priority order to respective positions in a cell that are set by the base station.

(Supplementary Note 7)

There is provided the information processing apparatus according to any one of supplementary notes 1 to 6, wherein the gateway apparatus is controlled to instruct the devices about different data transmission timings by multicast at each position, accumulate data received from the respective devices till a final time among the data transmission timings, and transmit the data to the base station.

(Supplementary Note 8)

There is provided the information processing apparatus according to supplementary note 7, wherein the data transmission timing is changed between the gateway apparatus present at the first position and the gateway apparatus present at the second position.

(Supplementary Note 9)

There is provided a gateway apparatus comprising:

a transmitter that executes a gateway function at a first timing at a first position, collects data from a plurality of devices present near the first position, and transmits aggregated data to a base station, and executes the gateway function at a second timing different from the first timing at a second position different from the first position, collects data from a plurality of devices present near the second position, and transmits aggregated data to the base station; and a moving unit that moves from the first position to the second position.

(Supplementary Note 10)

There is provided an information processing method for controlling at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

(Supplementary Note 11)

There is provided an information processing program for causing a computer to execute a method, comprising controlling at least one gateway apparatus to execute a gateway function at a first timing at a first position, collect data from a plurality of devices present near the first position, and transmit aggregated data to a base station, and execute the gateway function at a second timing different from the first timing at a second position different from the first position, collect data from a plurality of devices present near the second position, and transmit aggregated data to the base station.

The invention claimed is:

1. An information processing apparatus that controls at least one gateway apparatus to execute a gateway function at a first timing and at a first position, collect first data from a first plurality of devices present near the first position, and transmit first aggregated data to a base station, move to a second position which corresponds to locations of a second plurality of devices and which is notified by the base station, and execute the gateway function at the second position, collect second data from the second plurality of devices present near the second position, and transmit second aggregated data to the base station.

2. The information processing apparatus according to claim 1, wherein the information processing apparatus controls one gateway apparatus that moves from the first position to the second position, to execute the gateway function at the first timing and at the first position, collect the first data from a device present near the first position, and transmit the first aggregated data to the base station, and execute the gateway function at the second position, collect the second data from a device present near the second position, and transmit the second aggregated data to the base station.

3. The information processing apparatus according to claim 1, wherein the information processing apparatus controls a first gateway apparatus that collects the first data from a device present near the first position at the first timing and at the first position and transmits the first aggregated data to the base station, and a second gateway apparatus that collects the second data from a device present near the second position and transmits the second aggregated data to the base station.

4. The information processing apparatus according to claim 3, wherein the gateway apparatus is circulated in a predetermined direction to respective positions in a cell, the positions being set by the base station.

5. The information processing apparatus according to claim 3, wherein the gateway apparatus is circulated at random to respective positions in a cell, the positions being set by the base station.

6. The information processing apparatus according to claim 3, wherein the gateway apparatus is circulated based on a priority order to respective positions in a cell, the positions being set by the base station.

7. The information processing apparatus according to claim 1, wherein the gateway apparatus is controlled to instruct the devices about different data transmission timings by multicast at each position, accumulate data received from the respective devices till a final time among the data transmission timings, and transmit the accumulated data to the base station.

8. The information processing apparatus according to claim 7, wherein a data transmission timing is changed between the gateway apparatus present at the first position and the gateway apparatus present at the second position.

9. A gateway apparatus comprising:
a transmitter that
execiutes a gateway function at a first timing and at a first position, collects first data from a first plurality of devices present near the first position, and transmits first aggregated data to a base station, and executes the gateway function at a second timing different from the first timing and at a second position different from the first position, collects second data from a second plurality of devices present near the second position, and transmits second aggregated data to the base station; and a moving unit that moves the gateway apparatus from the first position to the second position.

10. An information processing method for controlling at least one gateway apparatus to execute a gateway function at a first timing and at a first position, collect first data from a first plurality of devices present near the first position, and transmit first aggregated data to a base station, move to a second position which corresponds to locations of a second plurality of devices and which is notified by the base station, and execute the gateway function at the second position different, collect second data from a second plurality of devices present near the second position, and transmit second aggregated data to the base station.

\* \* \* \* \*